United States Patent
Horng

(10) Patent No.: US 9,209,655 B2
(45) Date of Patent: Dec. 8, 2015

(54) MOTOR'S STATOR UNIT

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 235 days.

(21) Appl. No.: 13/912,308

(22) Filed: Jun. 7, 2013

(65) Prior Publication Data
US 2014/0015370 A1    Jan. 16, 2014

(30) Foreign Application Priority Data

Jul. 10, 2012 (TW) ............................. 101124815 A
Apr. 10, 2013 (TW) ............................. 102112749 A

(51) Int. Cl.
| H02K 5/16 | (2006.01) |
| H02K 1/18 | (2006.01) |
| H02K 7/14 | (2006.01) |
| H02K 3/52 | (2006.01) |
| H02K 5/167 | (2006.01) |

(52) U.S. Cl.
CPC ................ *H02K 1/187* (2013.01); *H02K 3/522* (2013.01); *H02K 5/1675* (2013.01); *H02K 7/14* (2013.01); *H02K 2203/12* (2013.01)

(58) Field of Classification Search
USPC ................................... 310/67 R, 90; 417/354
See application file for complete search history.

(56) References Cited

U.S. PATENT DOCUMENTS

| 5,663,604 | A | * | 9/1997 | Takahashi ........................ 310/91 |
| 6,700,257 | B2 | | 3/2004 | Lin |
| 7,737,589 | B2 | | 6/2010 | Sekiguchi et al. |
| 7,837,391 | B2 | | 11/2010 | Kitamura et al. |
| 2007/0065064 | A1 | * | 3/2007 | Kitamura et al. ............. 384/537 |
| 2007/0252451 | A1 | * | 11/2007 | Shibuya et al. ................. 310/64 |
| 2008/0157634 | A1 | | 7/2008 | Sekiguchi et al. |

FOREIGN PATENT DOCUMENTS

| TW | M284196 U | 12/2005 |
| TW | 201041279 A | 11/2010 |
| TW | 201210178 A | 3/2012 |

* cited by examiner

*Primary Examiner* — Hanh Nguyen
(74) *Attorney, Agent, or Firm* — Alan D. Kamrath; Kamrath IP Lawfirm, P.A.

(57) ABSTRACT

A motor's stator unit includes a base and a stator. The base has a shaft tube. The stator has a silicon steel plate unit, an insulation sleeve unit and a coil unit. The silicon steel plate unit has an inner circumferential wall forming a through-hole. The insulation sleeve unit has an engagement hole. The silicon steel plate unit and the insulation sleeve unit are stacked together. An enameled copper wire is wound around the insulation sleeve unit to form the coil unit. The engagement hole has a minimal diameter that is slightly smaller than an outer diameter of the shaft tube. The stator is press fit around the shaft tube via the insulation sleeve unit, to prevent the silicon steel plate unit of the stator from excessively compressing the shaft tube.

20 Claims, 9 Drawing Sheets

MOTOR'S STATOR UNIT

BACKGROUND OF THE INVENTION

1. Field of the Invention

The present invention generally relates to a motor's stator unit and, more particularly, to a motor's stator unit that can be coupled with a rotor or an impeller to construct a motor or a cooling fan.

2. Description of the Related Art

Conventionally, a motor or a cooling fan includes a base. A shaft tube is arranged on a center of the base. At least one bearing is installed in the shaft tube, so that a rotor is able to rotatably couple with the bearing. The conventional motor or the cooling fan further includes a stator having a silicon steel plate unit that is press fit around the shaft tube to prevent the stator from disengaging from the shaft tube.

Since the silicon steel plate unit is made of metal material, the silicon steel plate unit may excessively compress the shaft tube when fit around the shaft tube by press fitting. This may cause deformation of the shaft tube. The deformed shaft tube may further compress the bearing and therefore can damage or deform the bearing. As a result, the service life of the motor or the cooling fan is shortened.

Referring to FIG. 1, a modified fixed bearing structure of a DC fan is disclosed by Taiwan Patent No. 519259. The conventional fixed bearing structure 8 includes a base 81 and a shaft seat 82 arranged on a center of the base 81. The shaft seat 82 has an annular groove 821. The upper part of the shaft seat 82 is separated into an inner annular wall 822 and an outer annular wall 823 by the annular groove 821. A stator unit 83 is press fit around the outer annular wall 823. A retaining ring 84 is installed in the annular groove 821 to support the stator unit 83 and to prevent disengagement of the stator unit 83.

In the modified fixed bearing structure described above, the structure is of high complexity due to the formation process of the inner and outer annular walls 822, 823 and the installation process of the retaining ring 84, resulting in an inconvenient assembly.

Referring to FIG. 2, Taiwan Patent No. M284196 discloses a conventional cooling fan 9 comprising a fan frame 91, a bearing 92 and a stator 93. A central column 911 is arranged on a center of the fan frame 91. The bearing 92 is received in the central column 911. Threads 912 are arranged on upper and lower parts of an outer circumferential wall of the central column 911. The stator 93 may be fitted around the central column 911. The stator 93 includes an upper insulation sleeve 931 screwed to the thread 912 on the upper part of the central column 911, as well as an lower insulation sleeve 932 screwed to the thread 912 on the lower part of the central column 911. This structure provides enhanced coupling between the stator 93 and the central column 911.

Disadvantageously, not only does it require forming the threads 912 on the upper and lower parts of the outer circumferential wall of the central column 911, but it also requires forming another two threads on inner circumferential walls of the upper insulation sleeve 931 and the lower insulation sleeve 932 that can be engaged with the threads 912 of the central column 911. As a result, it is inconvenient to manufacture the cooling fan. In addition, it is also required to screw the upper insulation sleeve 931 and the lower insulation sleeve 932 to the central column 911, leading to an inconvenient assembly.

SUMMARY OF THE INVENTION

It is therefore the objective of this invention to provide a motor's stator unit that allows for easy assembly of the stator based on the simplified structure.

It is another objective of this invention to provide a motor's stator unit capable of preventing the shaft tube from being excessively compressed by the stator after assembly, preventing the malfunction of the motor or preventing the motor from generating noise due to the damaged bearing.

In a preferred embodiment, a motor's stator unit comprising a base and a stator is disclosed. The base has a shaft tube. The stator has a silicon steel plate unit, an insulation sleeve unit and a coil unit. The silicon steel plate unit has an inner circumferential wall forming a through-hole. The insulation sleeve unit has an engagement hole. The silicon steel plate unit and the insulation sleeve unit are stacked together to align the through-hole with the engagement hole. An enameled copper wire is wound around a predetermined part of the insulation sleeve unit to form the coil unit. The engagement hole of the insulation sleeve unit has a minimal diameter that is slightly smaller than an outer diameter of the shaft tube. The stator is press fit around an outer circumferential wall of the shaft tube via the insulation sleeve unit, to prevent the stator from excessively compressing the shaft tube.

In a preferred form shown, the insulation sleeve unit comprises an upper insulation sleeve and a lower insulation sleeve. The engagement hole of the insulation sleeve unit comprises a first engagement hole and a second engagement hole. The upper insulation sleeve has an inner circumferential wall forming the first engagement hole, and the lower insulation sleeve has an inner circumferential wall forming the second engagement hole. The first engagement hole has a diameter that is slightly smaller than the outer diameter of the shaft tube. The stator is press fit around the outer circumferential wall of the shaft tube via the upper insulation sleeve.

In the preferred form shown, the outer circumferential wall of the shaft tube is spaced from the inner circumferential wall of the silicon steel plate unit by a gap.

In the preferred form shown, the motor's stator unit further comprises a fixing ring fit around the shaft tube of the base to fix the insulation sleeve unit in place.

In the preferred form shown, the fixing ring is pressed down on the insulation sleeve unit.

In the preferred form shown, the motor's stator unit further comprises a fixing ring. The shaft tube has an opening end. The fixing ring is fit around the shaft tube in a position adjacent to the opening end to fix the upper insulation sleeve in place.

In the preferred form shown, the fixing ring presses the upper insulation sleeve.

In the preferred form shown, the shaft tube has an opening end. The shaft tube comprises an engagement portion at the opening end thereof, and the engagement portion is engaged with the insulation sleeve unit.

In the preferred form shown, the engagement portion is in the form of an engaging protrusion integrally formed at the opening end of the shaft tube, and the engaging protrusion is engaged with the upper insulation sleeve.

In the preferred form shown, a restraining protrusion is formed on the outer circumferential wall of the shaft tube. A positioning groove is formed on the inner circumferential wall of the lower insulation sleeve, and the restraining protrusion is engaged in the positioning groove.

In the preferred form shown, the second engagement hole of the lower insulation sleeve is larger than the outer diameter of the shaft tube.

In the preferred form shown, a buffering member is arranged between the upper insulation sleeve of the insulation sleeve unit and the silicon steel plate unit, or between the lower insulation sleeve of the insulation sleeve unit and the silicon steel plate unit.

In the preferred form shown, a first buffering member is arranged between the upper insulation sleeve of the insulation sleeve unit and the silicon steel plate unit, and a second buffering member is arranged between the lower insulation sleeve of the insulation sleeve unit and the silicon steel plate unit.

In the preferred form shown, a positioning shoulder is arranged on the outer circumferential wall of the shaft tube, and the stator is positioned on the positioning shoulder.

In the preferred form shown, the lower insulation sleeve of the insulation sleeve unit is positioned on the positioning shoulder.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
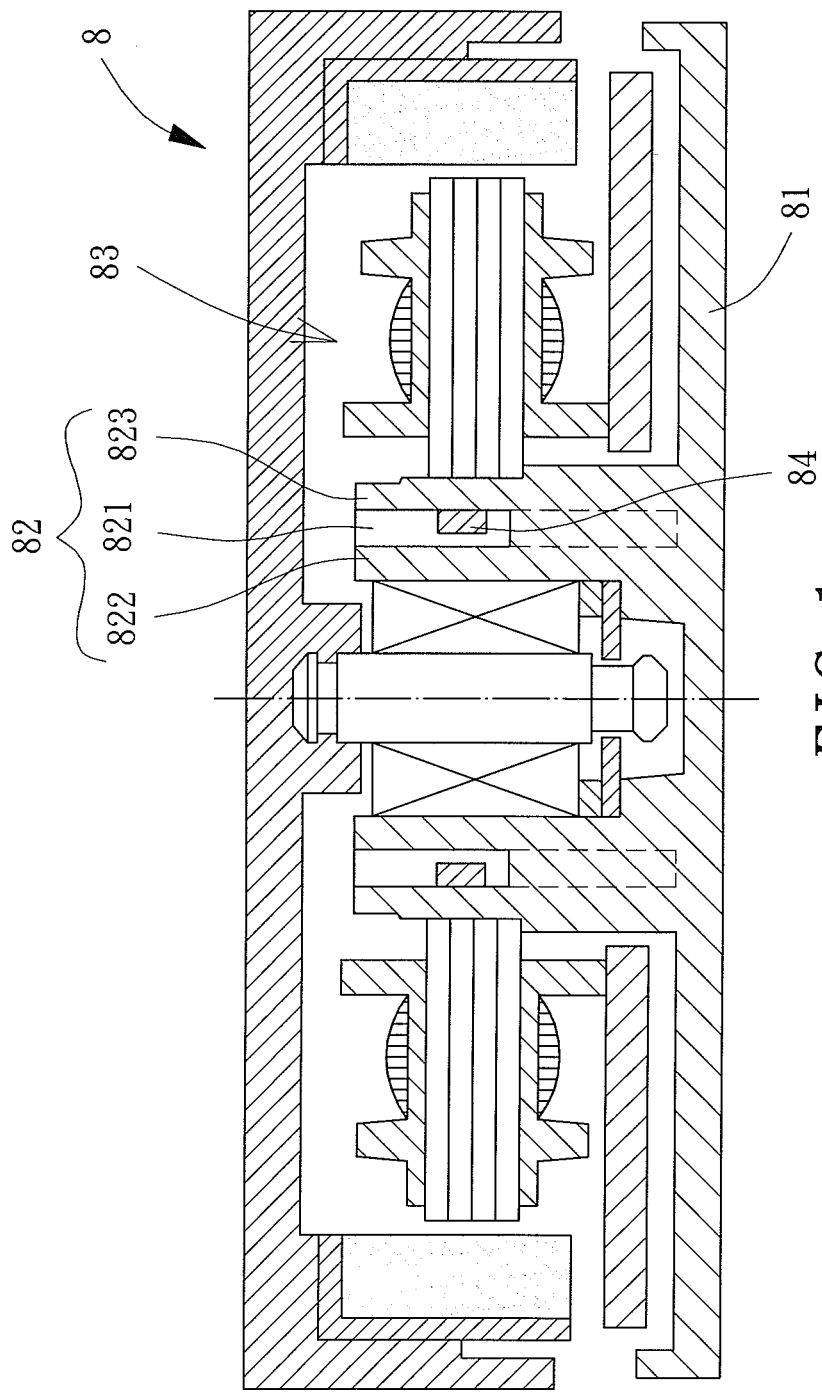
FIG. 1 is a cross-sectional view of a modified conventional fixed bearing structure of a DC fan.
Figure 2:
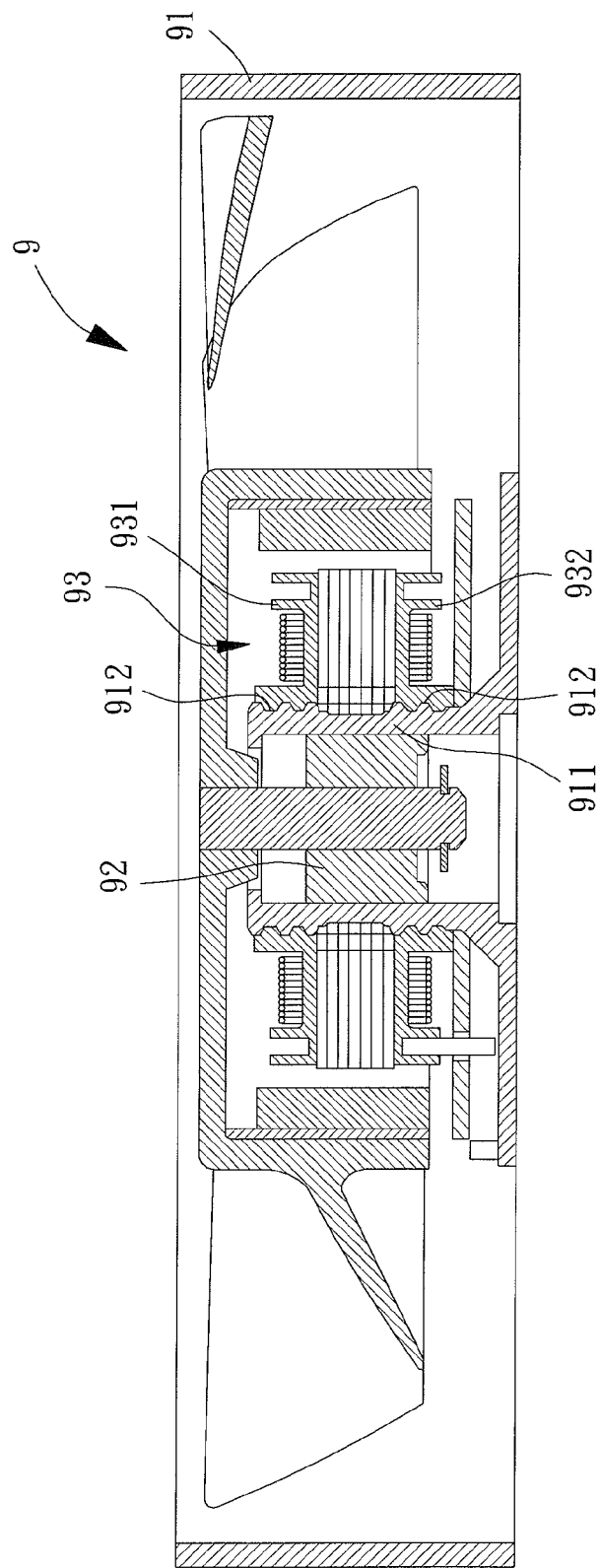
FIG. 2 is a cross-sectional view of a conventional cooling fan.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
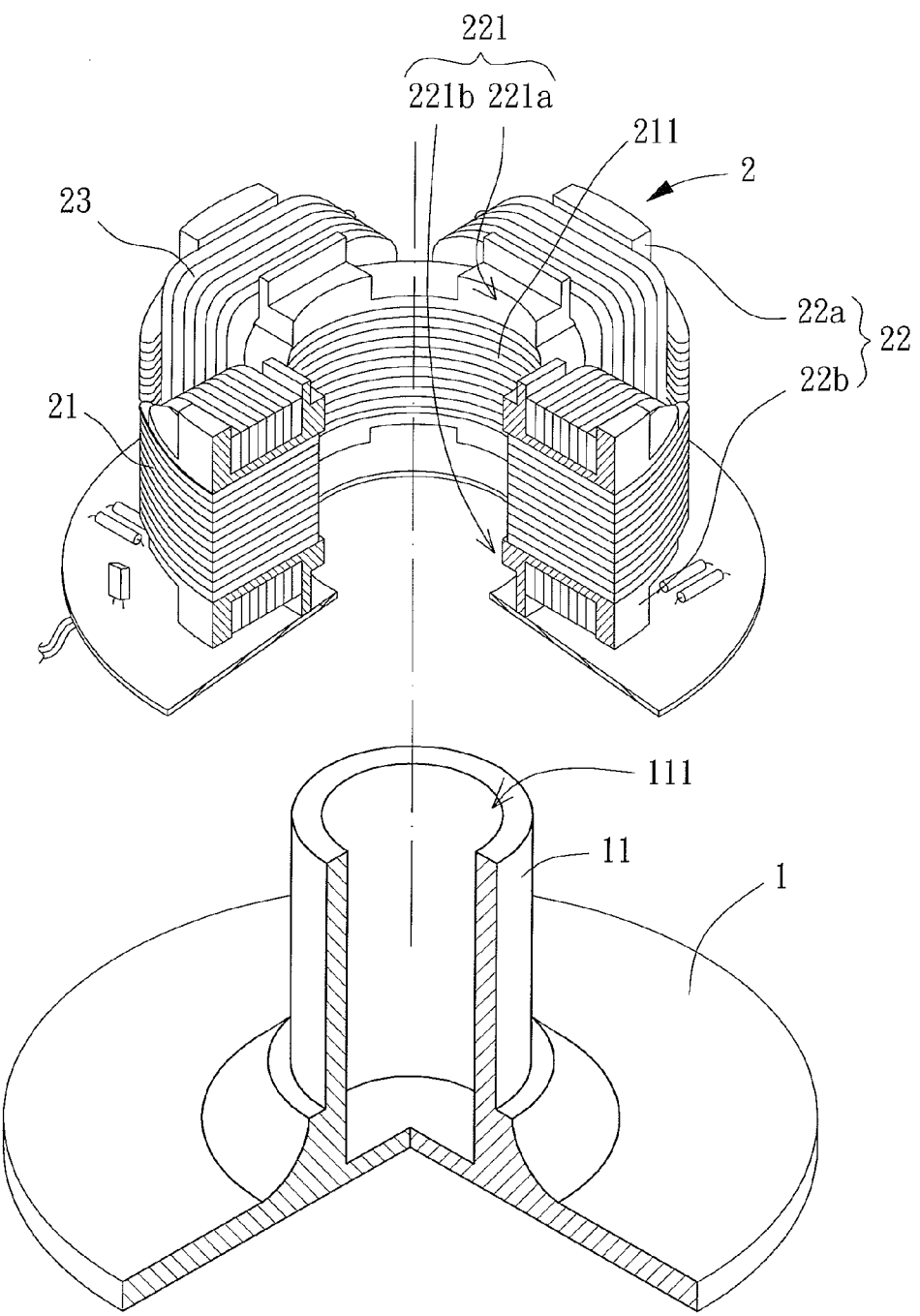
FIG. 3 is an exploded view of a motor's stator unit according to a preferred embodiment of the invention.

Referring to FIG. 3, a motor's stator unit is disclosed according to a preferred embodiment of the invention. The motor's stator unit includes a base 1 and a stator 2 that can be mounted on the base 1.

The base 1 includes a hollow shaft tube 11 (which can be made of plastic or metal material) that can receive an inner assembly. The shaft tube 11 may be mounted on or integrally formed with the base 1. The inner assembly may consist of a plurality of components that can be installed in the shaft tube 11 and can provide a variety of functions, such as a bearing, a wear-resisting plate, an engaging ring, a positioning ring, etc. However, the inner assembly includes at least the bearing. In addition, the shaft tube 11 includes an opening end 111 at a top of the shaft tube 11, as shown in FIG. 3.

Figure 4:
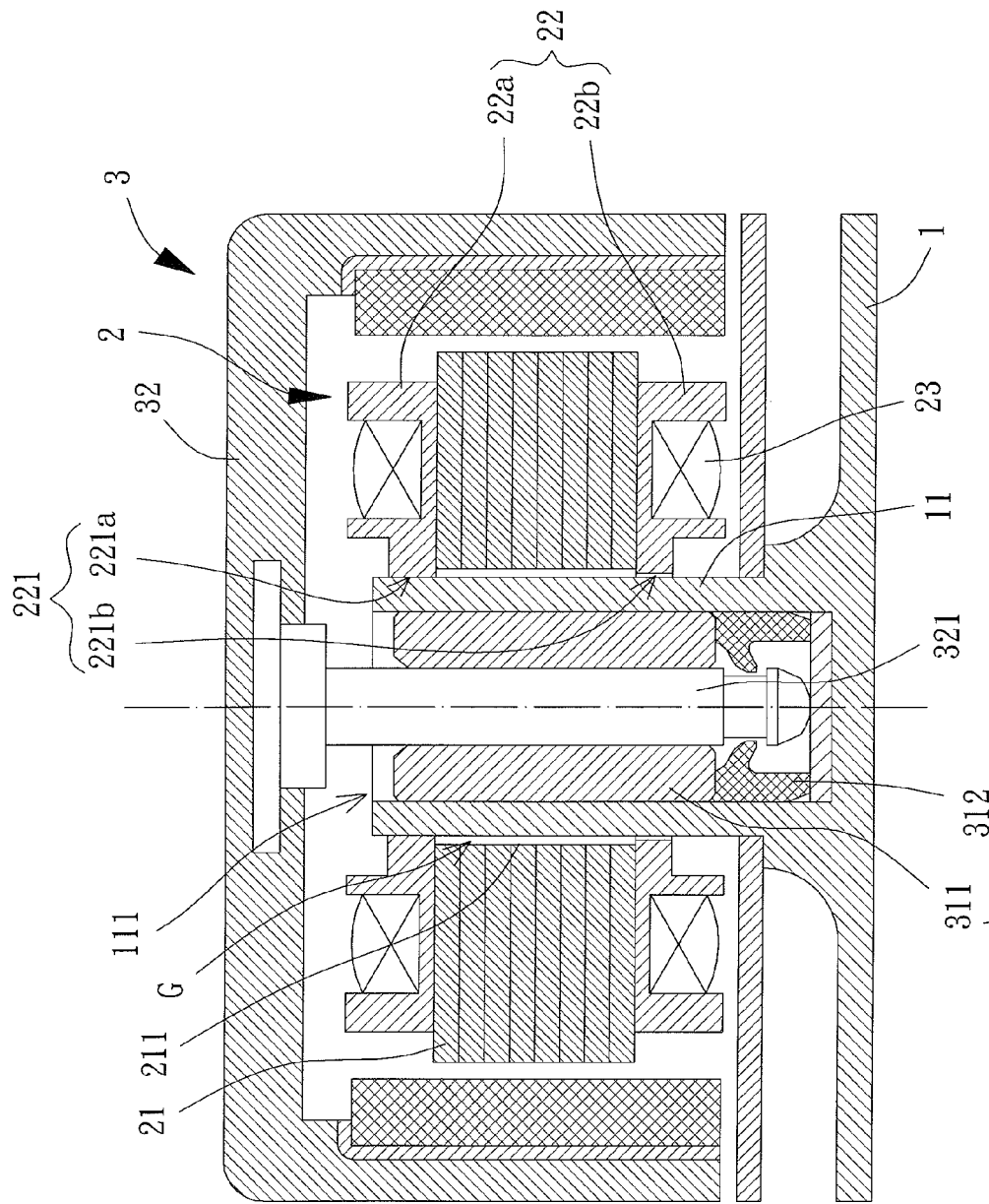
FIG. 4 is a cross-sectional view of a motor equipped with the stator unit of the preferred embodiment of the invention.

The stator 2 is coupled with the shaft tube 11 of the base 1. The stator 2 may be of any structure capable of driving a rotor 32 to rotate, as shown in FIG. 4. In this embodiment, the stator 2 may include a silicon steel plate unit 21, an insulation sleeve unit 22 and a coil unit 23. The silicon steel plate unit 21 includes an inner circumferential wall forming a through-hole 211. The insulation sleeve unit 22 includes an inner circumferential wall forming an engagement hole 221. The silicon steel plate unit 21 and the insulation sleeve unit 22 may be stacked together to align the through-hole 211 with the engagement hole 221. In this manner, the assembled silicon plate and insulation seat units 21 and 22 can be fit around the shaft tube 11. The silicon steel plate unit 21 may be coupled with the insulation sleeve unit 22, or may be formed with the insulation sleeve unit 22 as an integral injection molding. An enameled copper wire is wound around a predetermined part of the insulation sleeve unit 22 to form the coil unit 23.

When the motor's stator unit is in use, as shown in FIG. 4, an inner assembly 31 comprises a bearing 311 and an engaging ring 312. The inner assembly 31 may be installed in the shaft tube 11. The bearing 311 may be coupled with a shaft 321 of a rotor 32 to construct a motor 3. Thus, the stator 2 may be electrified to drive the rotor 32 to rotate. In addition, the motor's stator unit may serve as a fan frame and the rotor 32 may serve as an impeller, to construct a cooling fan (not shown). The detailed structure and operation of the motor 3 (or cooling fan) is not described herein as it would be readily appreciated by one having ordinary skill in the art.

In the motor's stator unit, the engagement hole 221 of the insulation sleeve unit 22 has a minimal diameter that is slightly smaller than an outer diameter of the shaft tube 11. The stator 2 is arranged around an outer circumferential wall of the shaft tube 11 by press fitting the insulation sleeve unit 22 around the shaft tube 11, thereby preventing the stator 2 from disengaging from the shaft tube 11. The shaft tube 11 and the insulation sleeve unit 22 are generally made of plastic material. Therefore, the insulation sleeve unit 22 that is press fit around the shaft tube 11 will not result in excessive compression of the shaft tube 11, preventing the deformation of the shaft tube 11.

Specifically, in the embodiment, the insulation sleeve unit 22 includes an upper insulation sleeve 22a and a lower insulation sleeve 22b. Based on this, the engagement hole 221 of the insulation sleeve unit 22 may include a first engagement hole 221a corresponding to the upper insulation sleeve 22a, as well as a second engagement hole 221b corresponding to the lower insulation sleeve 22b. The insulation sleeve unit 22 is press fit around the shaft tube 11 through at least one of the first and second engagement holes 221a and 221b. In particular, the first engagement hole 221a has a diameter that is slightly smaller than the outer diameter of the shaft tube 11. Therefore, when the upper insulation sleeve 22a is press fit around the shaft tube 11, it can be ensured that the silicon steel plate unit 21 and the lower insulation sleeve 22b are securely fixed between the upper insulation sleeve 22a and the base 1, achieving a reinforced positioning effect.

Referring to FIG. 4, based on the concept that the stator 2 is press fit around the shaft tube 11 through the insulation sleeve unit 22, a gap G may preferably be formed between the inner circumferential wall of the silicon steel plate unit 21 and the outer circumferential wall of the shaft tube 11. This ensures that the silicon steel plate unit 21 will not make contact with the shaft tube 11, preventing the deformation of the shaft tube 11 resulting from the rigid material (silicon steel plate unit 21) excessively compressing the shaft tube 11.

Moreover, when the motor's stator unit is applied to a motor or a cooling fan, the vibration resulting from contact between the silicon steel plate unit 21 and the shaft tube 11 may be reduced via the gap G. As a result, noise is reduced, and malfunction of the motor resulting from the damage to or the deformation of the bearing 311 is prevented.

Referring to FIG. 4 again, the diameter of the second engagement hole 221b of the lower insulation sleeve 22b is preferably slightly larger than the outer diameter of the shaft tube 11 to allow the lower insulation sleeve 22b to be easily fit through the shaft tube 11. Although the diameter of the second engagement hole 221b is larger than the outer diameter of the shaft tube 11, the silicon steel plate unit 21 and the lower insulation sleeve 22b may still be securely fixed between the upper insulation sleeve 22a and the base 1 by press fitting the upper insulation sleeve 22a around the shaft tube 11, achieving convenient assembly.

Figure 5:
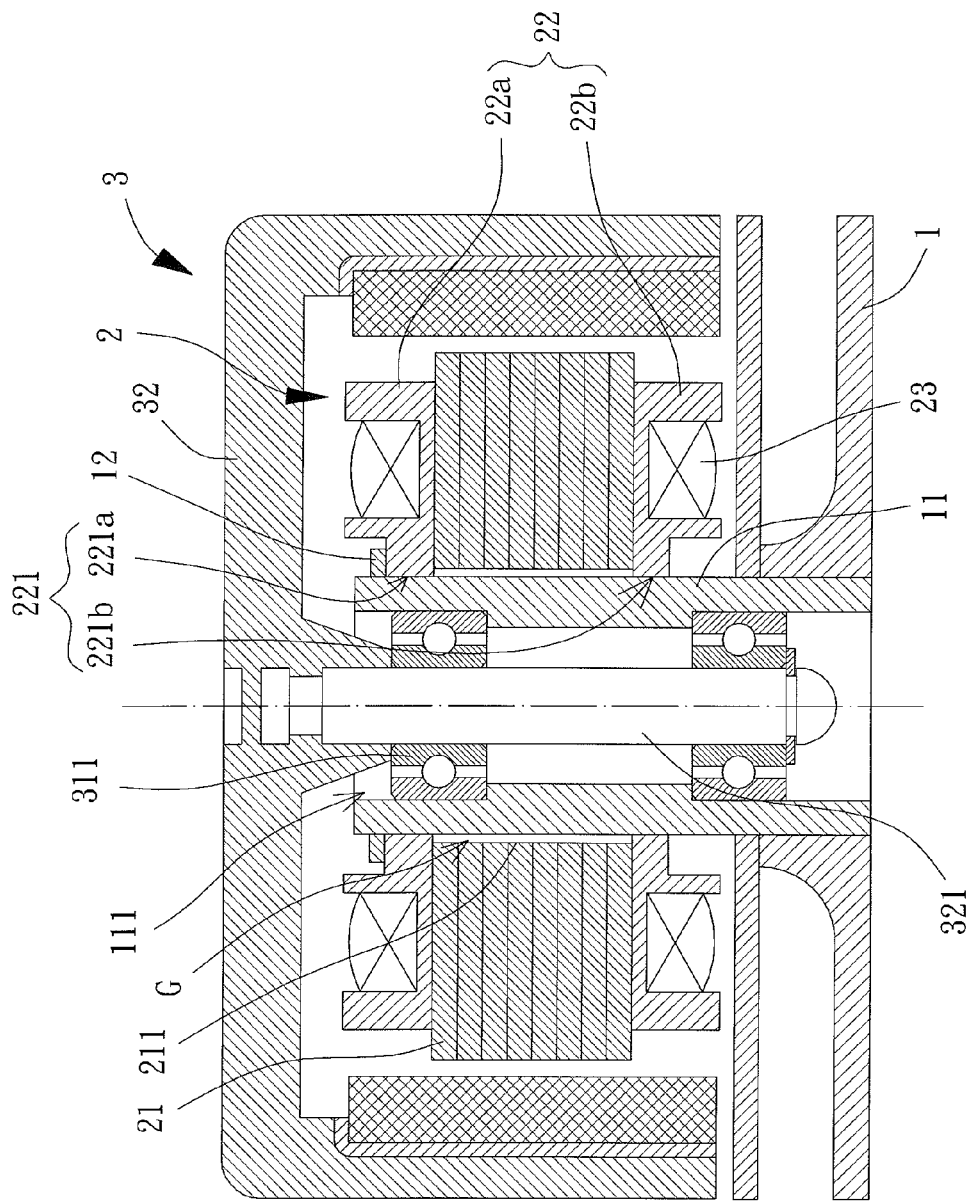
FIG. 5 is a cross-sectional view of a motor equipped with a stator unit having a fixing ring according to the preferred embodiment of the invention.

Referring to FIG. 5, the shaft tube 11 of the base 1 may be a metallic shaft tube. A fixing ring 12 is preferably fit around the metallic shaft tube to fix the insulation sleeve unit 22 in place. In a preferred case, the fixing ring 12 is pressed down on the insulation sleeve unit 22. In this embodiment, the fixing ring 12 is adjacent to the opening end 111 of the shaft tube 11 to position the upper insulation sleeve 22a. This efficiently prevents the insulation sleeve unit 22 from disengaging from the shaft tube 11.

Figure 6:
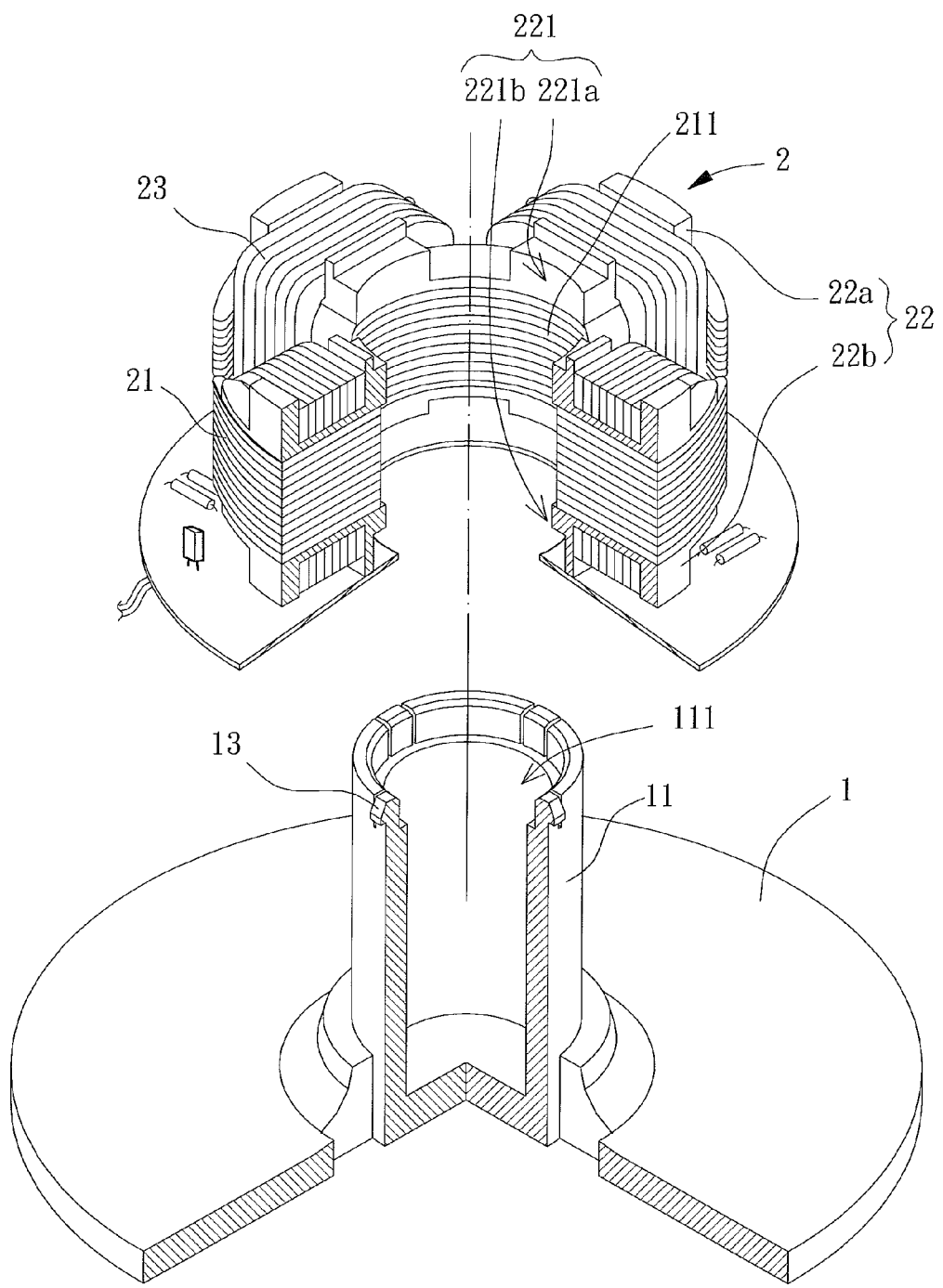
FIG. 6 is an exploded view of another motor's stator unit having an engagement portion according to the preferred embodiment of the invention.
Figure 7:
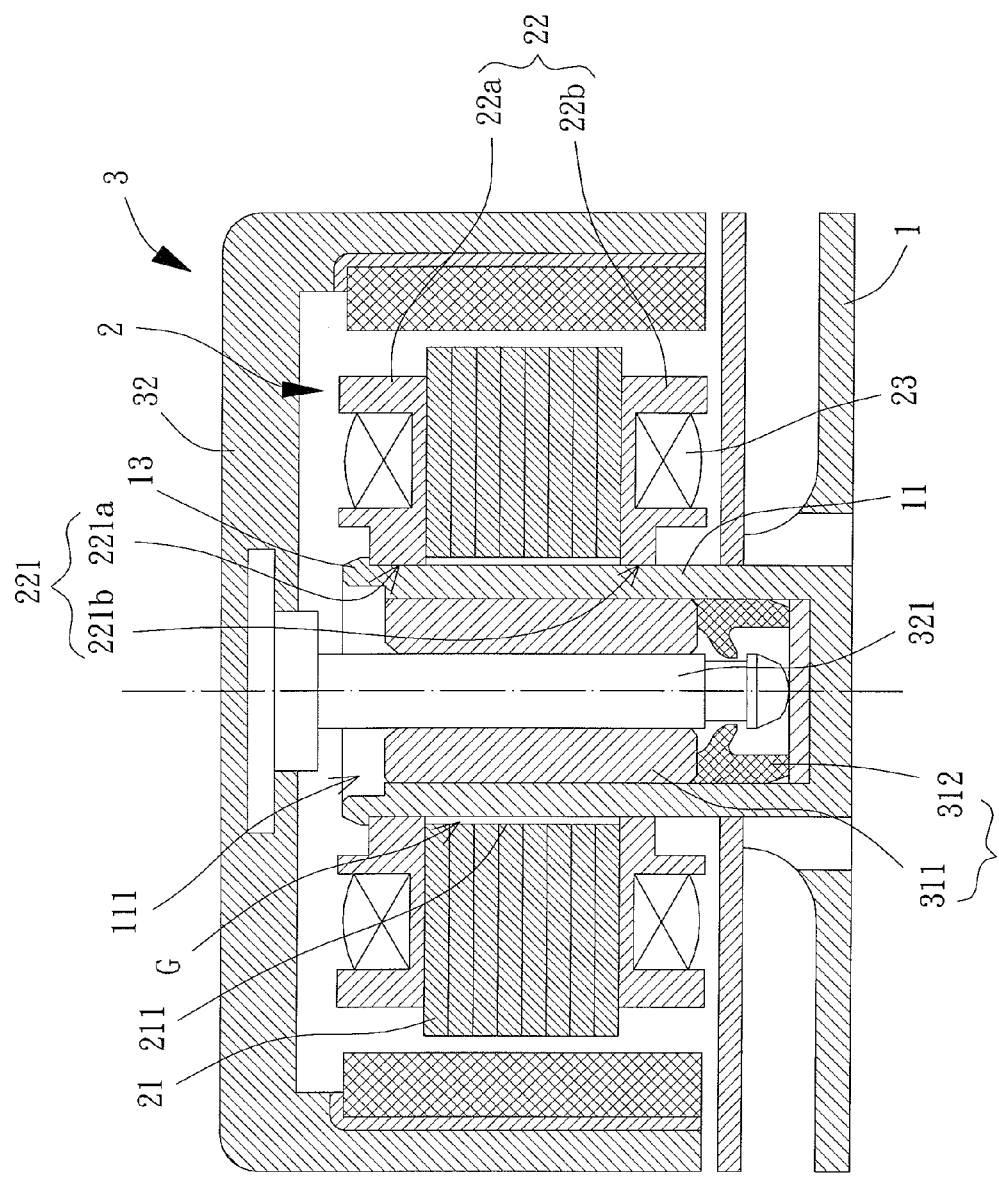
FIG. 7 is a cross-sectional view of a motor equipped with the stator unit shown in FIG. 6.

Referring to FIGS. 6 and 7, the shaft tube 11 preferably includes an engagement portion 13 at the opening end 111 thereof. The engagement portion 13 is adapted to position the insulation sleeve unit 22. In the embodiment, the engagement portion 13 is in the form of an engaging protrusion integrally formed on the part of the outer circumferential wall of the shaft tube 11 adjacent to the opening end 111. The engaging protrusion is adapted to position the upper insulation sleeve 22a. This also efficiently prevents the insulation sleeve unit 22 from disengaging from the shaft tube 11.

Figure 8:
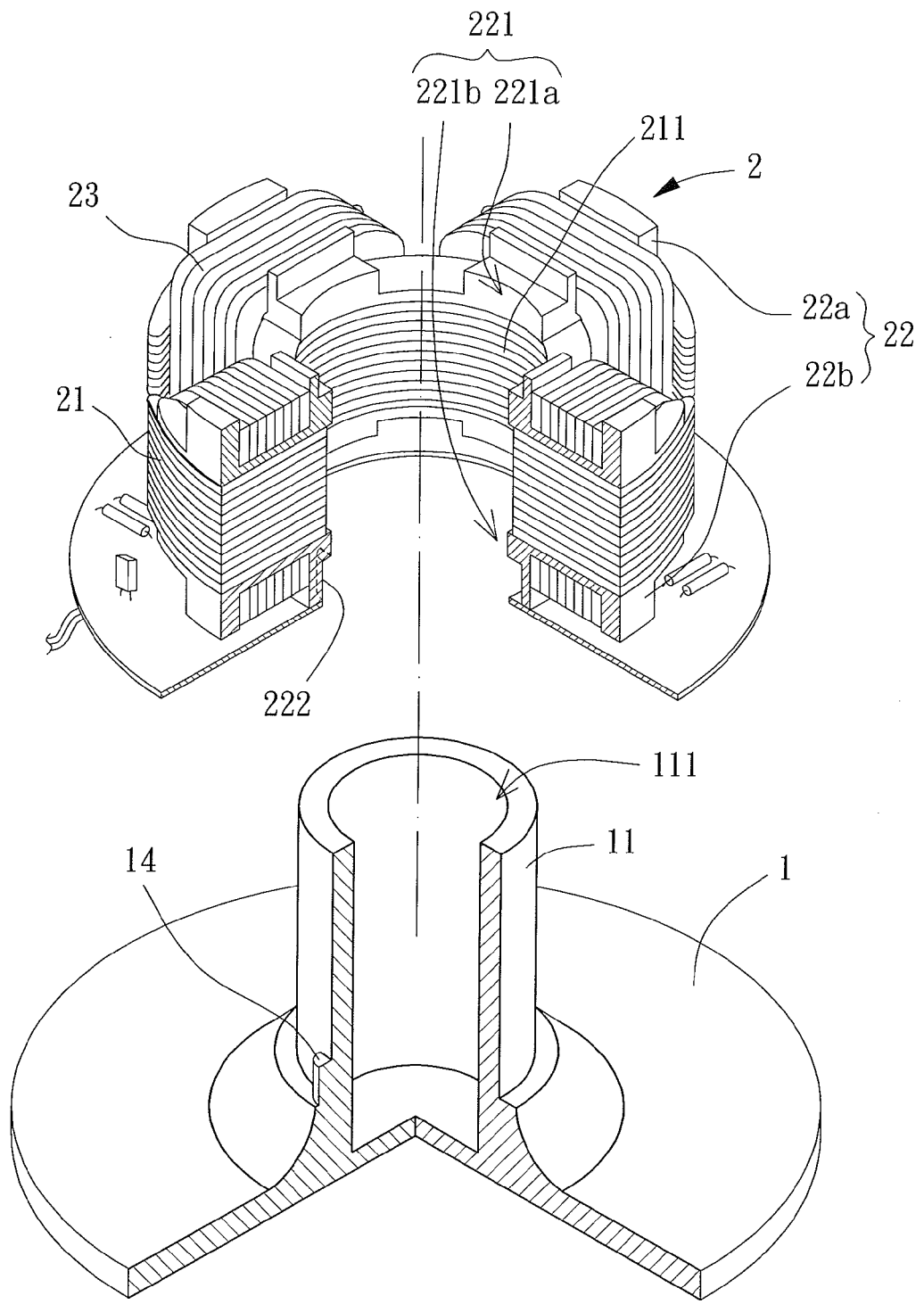
FIG. 8 is an exploded view of another motor's stator unit having a restraining protrusion and a positioning groove according to the preferred embodiment of the invention.

Referring to FIG. 8, a restraining protrusion 14 is preferably formed on the part of the outer circumferential wall of the shaft tube 11 adjacent to the bottom of the shaft tube 11. In addition, a positioning groove 222 is formed on an inner circumferential wall of the lower insulation sleeve 22b. The restraining protrusion 14 may be engaged in the positioning groove 222. When the insulation sleeve unit 22 is fit around the shaft tube 11, it can prevent the undesired movement of the stator 2 relative to the shaft tube 11 via the engagement between the restraining protrusion 14 and the positioning groove 222.

Figure 9:
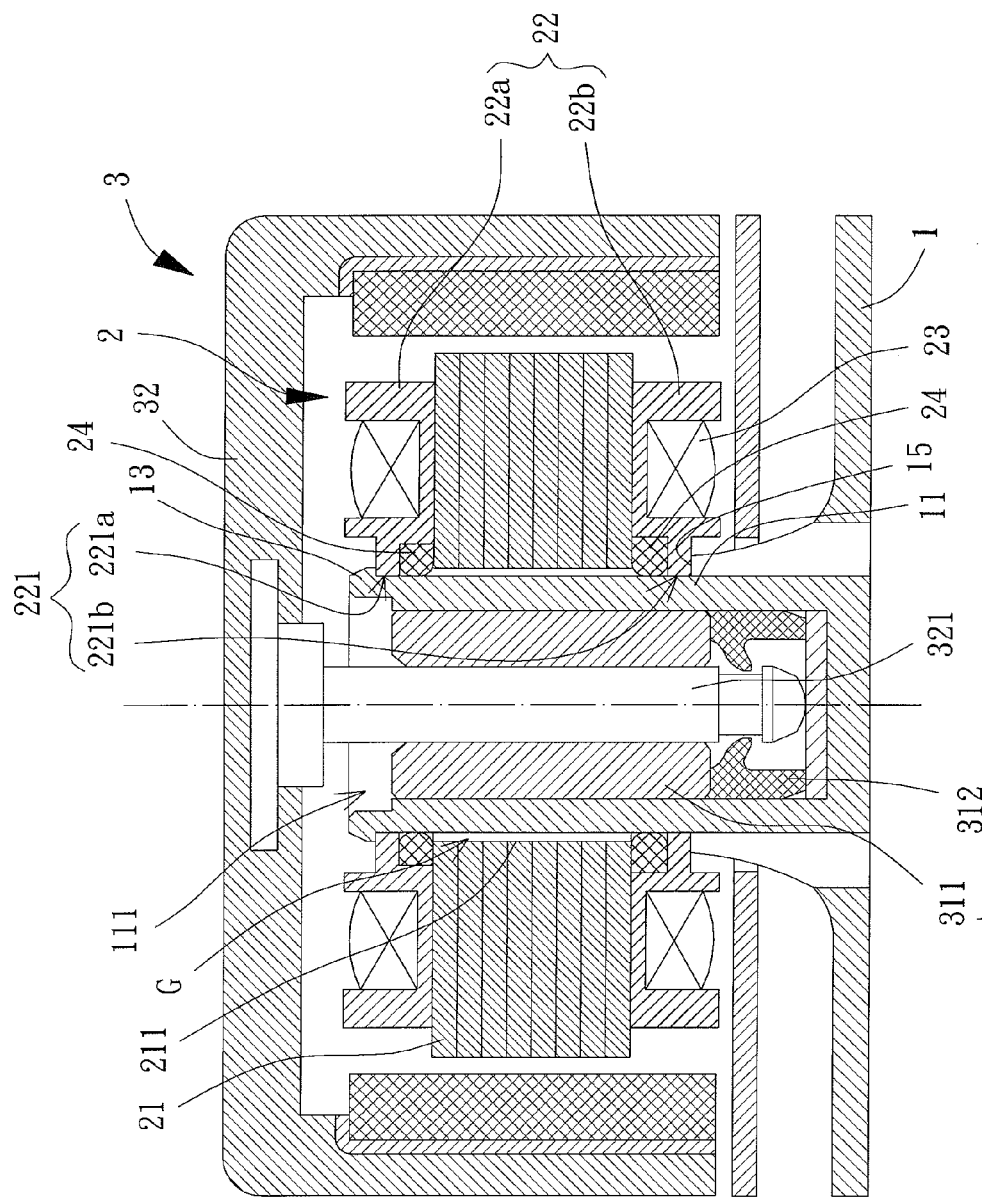
FIG. 9 is a cross-sectional view of another motor equipped with a stator unit having a positioning shoulder and two buffering members according to the preferred embodiment of the invention.

Referring to FIG. 9 again, a buffering member 24 is preferably arranged between the upper insulation sleeve 22a of the insulation sleeve unit 22 and the silicon steel plate unit 21, or between the lower insulation sleeve 22b of the insulation sleeve unit 22 and the silicon steel plate unit 21. It is also possible that two buffering members 24 (first and second buffering members 24) are provided, with one of which (first buffering member 24) arranged between the upper insulation sleeve 22a and the silicon steel plate unit 21, and with the other one of which (second buffering member 24) arranged between the lower insulation sleeve 22b and the silicon steel plate unit 21. Thus, the required buffering effect can be provided between the insulation sleeve unit 22 and the silicon steel plate unit 21 during the assembly and use of the motor or cooling fan. The buffering member 24 may be made of rubber or other similar material with the same function (with elasticity). The buffering member 24 may be in the form of a ring for convenient Assembly. A positioning shoulder 15 is preferably arranged on the outer circumferential wall of the shaft tube 11. The stator 2 (such as the silicon steel plate unit 21 or the insulation sleeve unit 22) may be positioned on the positioning shoulder 15. In the example shown in FIG. 9, the lower insulation sleeve 22b of the insulation sleeve unit 22 is positioned on the positioning shoulder 15 to achieve an improved positioning effect of the stator 2.

It can be recognized from the above description that, through the press fit between the insulation sleeve unit 22 and the shaft tube 11, the stator 2 can be securely coupled with the shaft tube 11 using the simple structure without having the shaft tube 11 excessively compressed by the silicon steel plate unit 21 of the stator 2. Thus, convenient assembly is achieved, and deformation of the shaft tube is prevented.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor's stator unit comprising:
    a base having a shaft tube; and
    a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together to align the through-hole with the engagement hole, wherein an enameled copper wire is wound around a predetermined part of the insulation sleeve unit to form the coil unit, wherein the engagement hole of the insulation sleeve unit has a minimal diameter that is slightly smaller than an outer diameter of the shaft tube, wherein the stator is press fit around an outer circumferential wall of the shaft tube via the insulation sleeve unit, and wherein the outer circumferential wall of the shaft tube is spaced from the inner circumferential wall of the silicon steel plate unit by a gap.

2. The motor's stator unit as claimed in claim 1, wherein a positioning shoulder is arranged on the outer circumferential wall of the shaft tube, and wherein the stator is positioned on the positioning shoulder.

3. A motor's stator unit comprising:
    a base having a shaft tube;
    a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together to align the through-hole with the engagement hole, wherein an enameled copper wire is wound around a predetermined part of the insulation sleeve unit to form the coil unit, wherein the engagement hole of the insulation sleeve unit has a minimal diameter that is slightly smaller than an outer diameter of the shaft tube, wherein the stator is press fit around an outer circumferential wall of the shaft tube via the insulation sleeve unit; and
    a fixing ring fit around the shaft tube of the base to fix the insulation sleeve unit in place.

4. The motor's stator unit as claimed in claim 3, wherein the insulation sleeve unit comprises an upper insulation sleeve and a lower insulation sleeve, wherein the engagement hole of the insulation sleeve unit comprises a first engagement hole and a second engagement hole, wherein the upper insulation sleeve has an inner circumferential wall forming the first engagement hole, wherein the lower insulation sleeve has an inner circumferential wall forming the second engagement hole, wherein the first engagement hole has a diameter that is slightly smaller than the outer diameter of the shaft tube, and wherein the stator is press fit around the outer circumferential wall of the shaft tube via the upper insulation sleeve.

5. The motor's stator unit as claimed in claim 4, wherein the shaft tube has an opening end, wherein the fixing ring is fit around the shaft tube in a position adjacent to the opening end to fix the upper insulation sleeve in place.

6. The motor's stator unit as claimed in claim 5, wherein the fixing ring fixes the upper insulation sleeve in place.

7. The motor's stator unit as claimed in claim 5, wherein a positioning shoulder is arranged on the outer circumferential wall of the shaft tube, and wherein the stator is positioned on the positioning shoulder.

8. The motor's stator unit as claimed in claim 5, wherein the second engagement hole of the lower insulation sleeve is larger than the outer diameter of the shaft tube.

9. The motor's stator unit as claimed in claim 4, wherein the shaft tube has an opening end, wherein the shaft tube comprises an engagement portion at the opening end thereof, and wherein the engagement portion is engaged with the insulation sleeve unit.

10. The motor's stator unit as claimed in claim 9, wherein the engagement portion is in the form of an engaging protrusion integrally formed at the opening end of the shaft tube, and wherein the engaging protrusion is engaged with the upper insulation sleeve.

11. The motor's stator unit as claimed in claim 4, wherein the second engagement hole of the lower insulation sleeve is larger than the outer diameter of the shaft tube.

12. The motor's stator unit as claimed in claim 4, wherein a positioning shoulder is arranged on the outer circumferential wall of the shaft tube, and wherein the stator is positioned on the positioning shoulder.

13. The motor's stator unit as claimed in claim 12, wherein the lower insulation sleeve of the insulation sleeve unit is positioned on the positioning shoulder.

14. The motor's stator unit as claimed in claim 3, wherein the fixing ring presses the insulation sleeve unit.

15. A motor's stator unit comprising:
a base having a shaft tube; and
a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together to align the through-hole with the engagement hole, wherein an enameled copper wire is wound around a predetermined part of the insulation sleeve unit to form the coil unit, wherein the engagement hole of the insulation sleeve unit has a minimal diameter that is slightly smaller than an outer diameter of the shaft tube, wherein the stator is press fit around an outer circumferential wall of the shaft tube via the insulation sleeve unit, wherein the insulation sleeve unit comprises an upper insulation sleeve and a lower insulation sleeve, wherein the engagement hole of the insulation sleeve unit comprises a first engagement hole and a second engagement hole, wherein the upper insulation sleeve has an inner circumferential wall forming the first engagement hole, wherein the lower insulation sleeve has an inner circumferential wall forming the second engagement hole, wherein the first engagement hole has a diameter that is slightly smaller than the outer diameter of the shaft tube, wherein the stator is press fit around the outer circumferential wall of the shaft tube via the upper insulation sleeve, wherein a restraining protrusion is formed on the outer circumferential wall of the shaft tube, wherein a positioning groove is formed on the inner circumferential wall of the lower insulation sleeve, and wherein the restraining protrusion is engaged in the positioning groove.

16. The motor's stator unit as claimed in claim 15, wherein a positioning shoulder is arranged on the outer circumferential wall of the shaft tube, and wherein the stator is positioned on the positioning shoulder.

17. The motor's stator unit as claimed in claim 15, wherein the shaft tube has an opening end, wherein the shaft tube comprises an engagement portion at the opening end thereof, and wherein the engagement portion is engaged with the insulation sleeve unit.

18. A motor's stator unit comprising:
a base having a shaft tube; and
a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together to align the through-hole with the engagement hole, wherein an enameled copper wire is wound around a predetermined part of the insulation sleeve unit to form the coil unit, wherein the engagement hole of the insulation sleeve unit has a minimal diameter that is slightly smaller than an outer diameter of the shaft tube, wherein the stator is press fit around an outer circumferential wall of the shaft tube via the insulation sleeve unit, wherein the insulation sleeve unit comprises an upper insulation sleeve and a lower insulation sleeve, wherein the engagement hole of the insulation sleeve unit comprises a first engagement hole and a second engagement hole, wherein the upper insulation sleeve has an inner circumferential wall forming the first engagement hole, wherein the lower insulation sleeve has an inner circumferential wall forming the second engagement hole, wherein the first engagement hole has a diameter that is slightly smaller than the outer diameter of the shaft tube, wherein the stator is press fit around the outer circumferential wall of the shaft tube via the upper insulation sleeve, wherein a buffering member is arranged between the upper insulation sleeve of the insulation sleeve unit and the silicon steel plate unit, or between the lower insulation sleeve of the insulation sleeve unit and the silicon steel plate unit.

19. The motor's stator unit as claimed in claim 18, wherein the shaft tube has an opening end, wherein the shaft tube comprises an engagement portion at the opening end thereof, and wherein the engagement portion is engaged with the insulation sleeve unit.

20. A motor's stator unit comprising:
a base having a shaft tube; and
a stator having a silicon steel plate unit, an insulation sleeve unit and a coil unit, wherein the silicon steel plate unit has an inner circumferential wall forming a through-hole, wherein the insulation sleeve unit has an engagement hole, wherein the silicon steel plate unit and the insulation sleeve unit are stacked together to align the through-hole with the engagement hole, wherein an enameled copper wire is wound around a predetermined part of the insulation sleeve unit to form the coil unit, wherein the engagement hole of the insulation sleeve unit has a minimal diameter that is slightly smaller than an outer diameter of the shaft tube, wherein the stator is press fit around an outer circumferential wall of the shaft tube via the insulation sleeve unit, wherein the insulation sleeve unit comprises an upper insulation sleeve and a lower insulation sleeve, wherein the engagement hole of the insulation sleeve unit comprises a first engagement hole and a second engagement hole, wherein the upper insulation sleeve has an inner circumferential wall forming the first engagement hole, wherein the lower insulation sleeve has an inner circumferential wall forming the second engagement hole, wherein the first engagement hole has a diameter that is slightly smaller than the outer diameter of the shaft tube, wherein the stator is press fit around the outer circumferential wall of the shaft tube via the upper insulation sleeve, wherein a first buffering member is arranged between the upper insulation sleeve of the insulation sleeve unit and the silicon steel plate unit, and wherein a second buffering member is arranged between the lower insulation sleeve of the insulation sleeve unit and the silicon steel plate unit.

* * * * *